United States Patent

[11] 3,620,510

| [72] | Inventor | Lawrence A. Longcore<br>Troy, Mich. |
|---|---|---|
| [21] | Appl. No. | 775,344 |
| [22] | Filed | Nov. 13, 1968 |
| [45] | Patented | Nov. 16, 1971 |
| [73] | Assignee | Arco Industries Corporation<br>Detroit, Mich.<br>Continuation-in-part of application Ser. No.<br>769,182, Oct. 21, 1968, now abandoned.<br>This application Nov. 13, 1968, Ser. No.<br>775,344 |

[54] GAS SCRUBBER WITH TANGENTIAL WATER INTRODUCTION
9 Claims, 5 Drawing Figs.

[52] U.S. Cl. .................................. 261/79 A,
261/112, 55/238
[51] Int. Cl. .................................. B05b 7/10
[50] Field of Search .......................... 55/238;
261/DIG. 54, 79 A, 112

[56] References Cited
UNITED STATES PATENTS

| 1,875,755 | 9/1932 | Noyes .................. | 55/238 |
| 2,351,864 | 6/1944 | Linderman, Jr. ............ | 261/79.1 |
| 2,684,836 | 7/1954 | Arborgh et al. ............ | 261/112 |

Primary Examiner—Tim R. Miles
Assistant Examiner—Steven H. Markowitz
Attorney—Barnard, McGlynn & Reising ABSTRACT: A venturi-type gas scrubber that is improved by the addition of wetting fluid distributing means for evenly distributing a wetting fluid from a fluid inlet onto inner surfaces of a portion of the venturi which taper toward its throat thereby exposing a completely wetted surface to gas entering the venturi from a gas inlet. The fluid-distributing means is embodied in a plurality of ledges spiraling downwardly from an elevated area of the inlet of the venturi with at least one portion of a given ledge overlying a portion of another ledge so that fluid that is introduced tangentially to the periphery of the venturi near its inlet is evenly distributed across the inner surfaces thereof.

PATENTED NOV 16 1971 3,620,510

INVENTOR.
Lawrence A. Longcore
BY
Barnard, McGlynn & Reising
ATTORNEYS

INVENTOR.
Lawrence A. Longcore
BY
Barnard, McGlynn & Reising
ATTORNEYS

GAS SCRUBBER WITH TANGENTIAL WATER INTRODUCTION

The present invention relates to gas scrubbers, and more particularly to improved means for distributing fluid across the operative surfaces of a venturi gas scrubber.

Certain industrial plants such as foundries, by their nature, generate gas in the form of smoke that has solids entrained therein. If this gas having the solids entrained therein is allowed to escape directly to the atmosphere, for example through a smokestack, the surrounding atmosphere will be polluted at the very minimum and sometimes these entrained solids will separate from the gas and settle on the surrounding populated area or landscape.

Many methods are known for removing some of the aforementioned entrained solids from the gases and among these is a venturi gas scrubber. A venturi gas scrubber generally comprises a funnel-shaped member as an inlet or, more specifically, a member which has an enlarged opening that converges through a decreasing conical-shaped section to a throat area, and then later enlarges to form a complete venturi. With this structure, the gas that contains contaminants or entrained solids is directed through an enlarged opening and exists from the funnel-shaped member through a smaller opening. The incoming gas impinges on the walls of the converging or decreasing conical section of the funnel which, if not sufficiently and uniformly wetted, causes separation of some of the entrained solids through a successive process of wetting and drying. This mechanical separation is not complete and will eventually cause troublesome buildups of solids on these walls. To prevent these buildups, the prior art forms of venturi gas scrubbers have attempted to introduce water onto these walls so that the solids in the gas impinging on these walls will be washed into a lower part of the venturi. In addition, this type scrubber causes water droplets to form in and above the venturi throat area thereby causing additional transfer of entrained particles from the gas to the fluid droplets.

In venturi gas scrubbers previously described, a problem is generated in that it is very difficult to maintain the entire surface of the decreasing conical area of the funnel-shaped member in a wetted condition. Additionally, the problem exists of maintaining an evenly distributed sheet of fluid across the aforementioned surface. Due to the fact that some areas are intermittently wetted, the venturi gas scrubbers of the art experience what is known as a wet-dry-wet condition which causes a hardening of the particles and a buildup on the surface of the funnel-shaped member resulting in the eventual plugging of the scrubber or at least changing its flow characteristics. The basic problem reduces itself to evenly distributing a fluid, such as water, evenly and completely across the surface of the decreasing conical section of the venturi gas scrubber and maintaining this even distribution constantly throughout the operation of the scrubber. None of the prior art devices have completely solved the aforementioned wet-dry-wet problem.

The present invention contemplates the solution to the problem of the wet-dry-wet condition by providing a venturi gas scrubber comprising a funnel-shaped member having a gas inlet and inner surfaces tapering towards a gas and fluid outlet; fluid inlet means for tangentially introducing fluid into the funnel-shaped member; and fluid-distributing means for evenly distributing the fluid from said fluid inlet means onto the inner surfaces of the funnel-shaped member tapering toward the outlet thereby exposing only a wetted surface to gas entering the funnel-shaped member from the gas inlet. More specifically, the fluid-distributing means includes a plurality of ledges decreasing in cross section toward one extremity with the ledges spiraling downwardly from an elevated point in the inlet of the funnel-shaped member so that at least one area of a given ledge overlies an area of another ledge similarly but oppositely disposed. Therefore, fluid being introduced tangentially to the periphery of the funnel-shaped member is evenly distributed thereacross.

Accordingly, it is an object of the present invention to provide an improved venturi gas scrubber comprising a funnel-shaped member having a gas inlet and inner surfaces tapering towards a gas and fluid outlet, fluid inlet means for tangentially introducing fluid into the funnel-shaped member, and fluid-distributing means for evenly distributing the fluid from the fluid inlet means onto the inner surfaces of the funnel-shaped member tapering toward the outlet thereby exposing only a wetted surface to gas entering the funnel-shaped member from the gas inlet.

It is another object of the present invention to provide an improved venturi gas scrubber according to the previous object wherein the fluid-distributing means includes at least one downwardly extending ledge onto which fluid is introduced by the fluid inlet means and dispersed onto the inner surfaces of the funnel-shaped member.

It is still another object of the present invention to provide an improved venturi gas scrubber having fluid-distributing means that includes at least one ledge decreasing in cross section toward one of its extremities thereby allowing fluid to progressively pour over the ledge onto the inner surfaces of a portion of the funnel-shaped member of the venturi.

It is yet another object of the present invention to provide an improved venturi gas scrubber having fluid-distributing means that includes a plurality of ledges spiraling downwardly from an elevated point in the inlet of the gas scrubber with at least one area of a given ledge overlying an area of another ledge so that fluid being introduced tangentially to the periphery of a portion of the gas scrubber is evenly distributed.

Other objects and attendant advantages of the present invention will be readily appreciated as the same becomes better understood by reference to the following detailed description when considered in connection with the accompanying drawings wherein.

Figure 1:
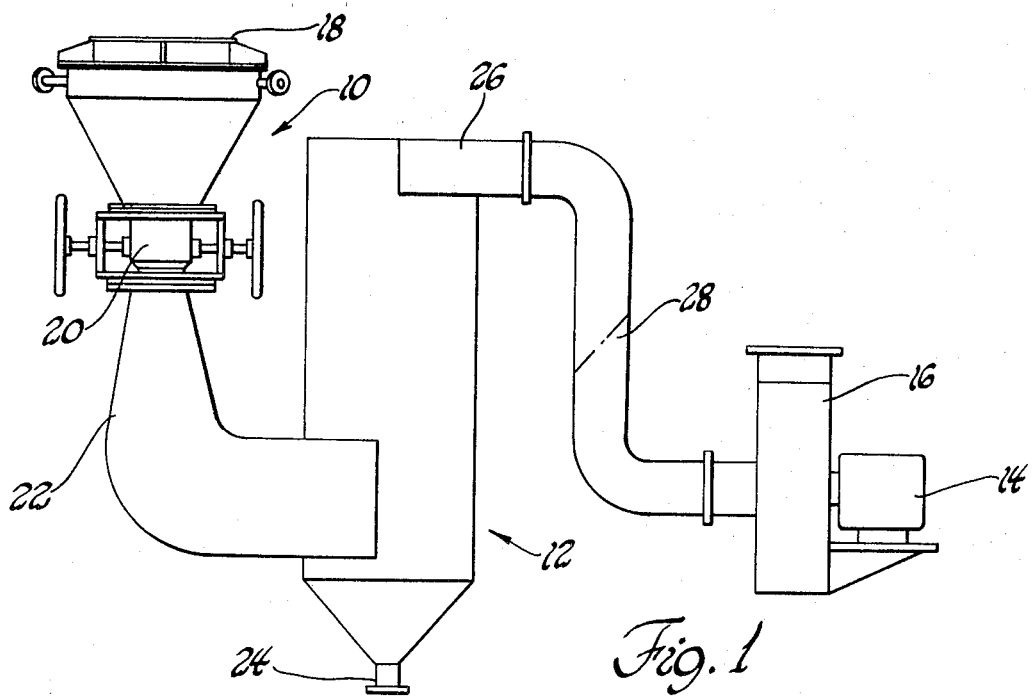
FIG. 1 is a diagrammatic showing of gas-scrubbing apparatus setting forth the operative environment of the present invention.

Referring to FIG. 1, venturi-type gas-scrubbing apparatus is illustrated and generally comprises a venturi section 10 and a cyclonic or other type separator 12. The venturi section 10 and separator section 12 are essentially in series with respect to one another relative to the flow of the gas to be cleaned. In other words, a gas to be cleaned first enters venturi section 10 and is wetted in a manner to be hereinafter described, and next the gas is routed to the cyclonic separator 12. Means other than a cyclonic separator are also commonly employed to separate wetted particles from the carrying gas.

Figure 2:
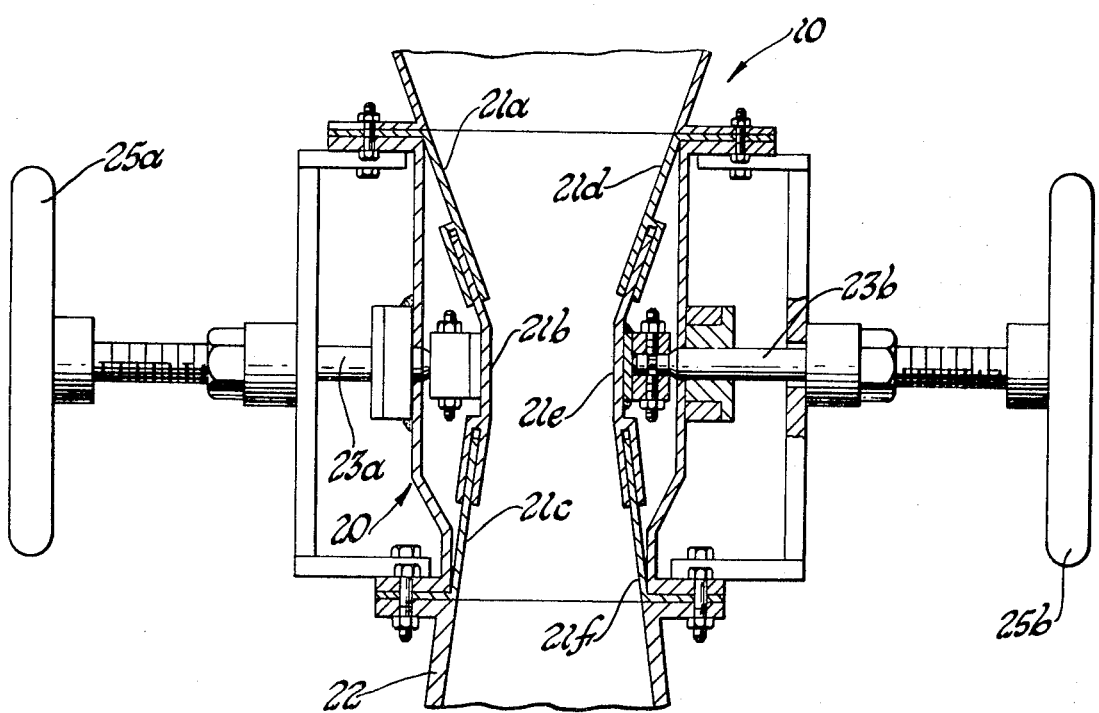
FIG. 2 is a sectional view of the variable throat portion of the scrubbing apparatus shown in FIG. 1.
Figure 5:
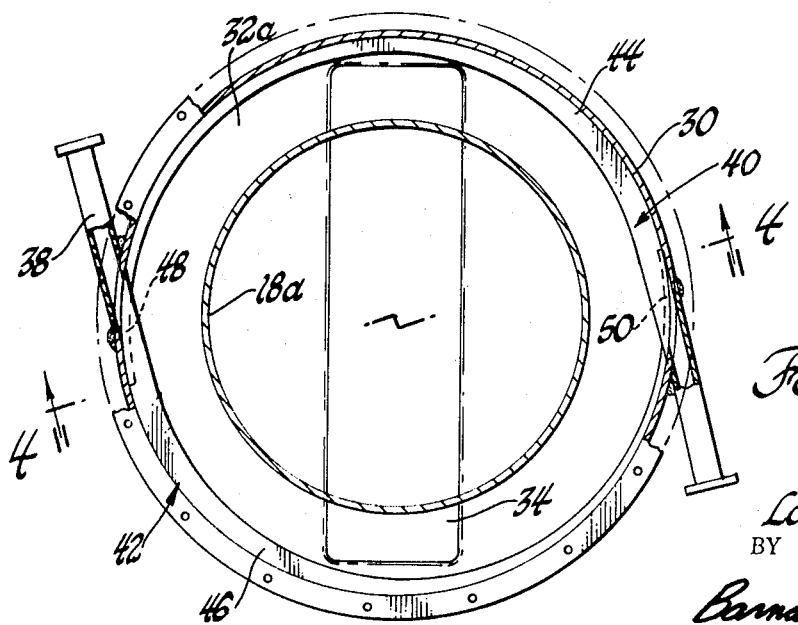
FIG. 5 is a plan view taken in the direction of the arrows in FIG. 3.

Generally speaking, a motor 14 operates suction fan 16 and draws a gas having particles entrained therein into inlet section 18 of venturi section 10. Variable throat 20 is adjusted for a desired pressure differential, and a fluid such as water is supplied in scrubber 10 with the gas having entrained particles therein passing through a water film and engaging scrubbing liquid mist generated in the throat with the particles being wetted and conveyed by the gas stream. Variable throat 20 maintains the pressure required to generate sufficient liquid mist to adequately wet materials from inlet section 18 into diverging section 22 of the venturi section 10. The variable-throat venturi is described herein as a common and convenient means of pressure adjustment. However, it is more common to employ a fixed throat for reasons of cost. The cross section of the throat 34 in FIG. 5 is rectangular. However, other configurations, for example, circular, may be suitable. The mass of gas, water, and entrained particles enters cyclonic separator 12. The purpose of cyclonic separator 12 is to separate the clean gas from a fluid such as water and the particles that are then desirably entrained in the water. The water and entrained particles are designed to enter outlet 24, and only the clean gas goes toward outlet 26, providing a path for gas communication to suction fan 16, the flow of which is regulated by damper 28. Variable throat 20 is illustrated in detail in FIG. 2. Variable throat 20 includes movable walls 21a, 21b, and 21c on one side and opposed movable walls 21d, 21e, and 21f. Walls 21a, 21b, and 21c telescope with respect to one another as do walls 21d, 21e, and 21f. Wall 21b and opposed wall 21e are connected to shafts 23a and 23b respectively which respectively carry crank 25a and 25b. A turning of cranks 25a and 25b cause walls 21b and 21e to telescope with respect to walls adjacent thereto causing an opening and closing of the venturi throat. Variable throat 20 is more completely described in copending application Ser. No. 447,214, now U.S. Pat. No. 3,427,006, assigned to the assignee of the present invention.

Figure 3:
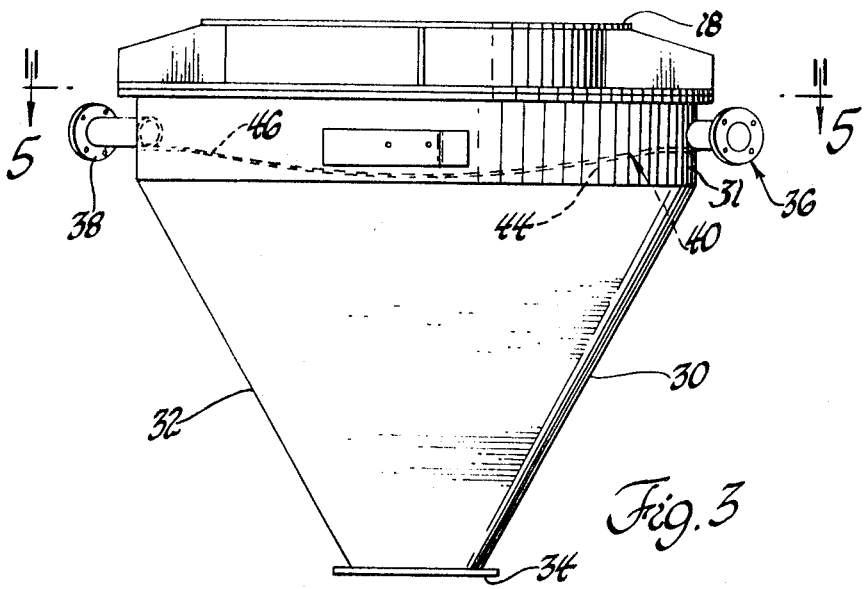
FIG. 3 is an elevational view with parts broken away of the converging section of the funnel-type portion of the venturi scrubber shown in FIG. 1.

Referring to FIG. 3, funnel-shaped member 30 has a gas inlet section 18 supported on its cylindrical upper end portion 31, and a conical sidewall 32 extending from the lower end of the cylindrical portion 31 and having an inner surface 32a tapering toward a gas and fluid outlet 34. Outlet 34 connects directly to variable throat 20 as seen in FIG. 1.

The inlet section 18 is supported on the large, upper end of the funnel member 30, and includes a cylindrical body portion 18a and a radially extending supporting flange 18b that overlies the outwardly extending flange on the upper, open end of the funnel member 30.

Fluid inlet means generally designated by numerals 36 and 38 tangentially introduce a wetting fluid into funnel shaped member 30, as better seen in FIG. 5. Referring to FIG. 5, fluid-distributing means 40 and 42 are provided for evenly distributing the wetting fluid from the fluid inlet means 36 and 38 respectively onto inner surfaces 32 of funnel-shaped member 30 which taper toward outlet 34, thereby exposing only a wetted surface to gas entering funnel-shaped member 30 by way of gas inlet 18.

Figure 4:
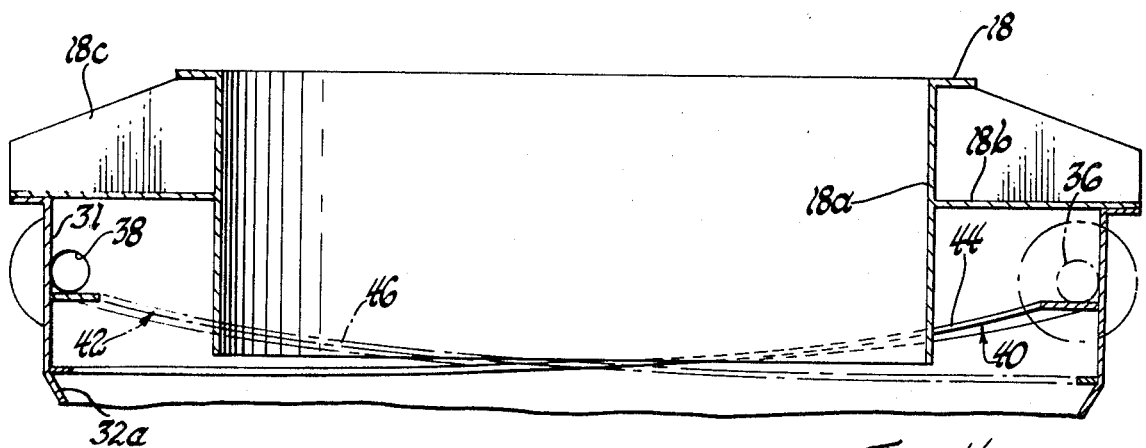
FIG. 4 is a sectional view taken along line 4—4 of FIG. 5.

As seen in FIGS. 3 and 4, the fluid dispensed from fluid inlet means 36 and 38 is situated at least as high as fluid-distributing means 40 and 42 respectively so that the fluid dispensed from the fluid inlet means passes onto fluid-distributing means 40 and 42.

As best seen in FIGS. 4 and 5, fluid-distributing means 40 and 42 are essentially identical and generally comprise downwardly extending ledges 44 and 46. In FIG. 4, both ledges are shown in the interest of clarity, but it is understood that, whereas ledge 44 is accurately shown, ledge 46 extends peripherally around funnel-shaped member 30 in an area opposite to ledge 44 generally located at the upper section of funnel 30, but it is shown in dotted lines to illustrate its height and shape relative to ledge 44.

Referring to FIG. 5, ledge 44 is seen as having its greatest dimension near fluid inlet means 36 and progressively diminishes in size and, consequently, cross section toward one of its extremities opposite fluid inlet means 36 thereby allowing fluid to progressively pour over ledge 44 onto the inner surfaces 32 of funnel-shaped member 30. It is understood that ledge 46 is similarly formed and shaped and operates identically to ledge 44. It should be noted, as seen in FIG. 5, that the plurality of ledges spiral downwardly at least 180° from an elevated point near the upper, open end of the funnel member 30 with at least areas 48 and 50 underlying areas of ledges 46 and 44 where inlets 36 and 38 are disposed respectively. This assures that the complete peripheral surface of inner surfaces 32 has wetting fluid distributed thereon with the evenness of the fluid distribution being brought about by the tapered dimension of ledges 44 and 46 as these ledges extend further away from fluid inlet means 36 and 38 respectively. It is understood that in the proximity of the fluid inlet means 36 and 38 there is more fluid due to the proximity to the inlet. As fluid spills over the edge of each ledge, the dimension of the ledge decreases progressively at points along the ledge further removed from the location of the fluid inlet means thereby compensating for a lesser volume of fluid at points further from the fluid inlet means. In this manner, the fluid is distributed evenly to the inner surfaces 32 of funnel-shaped member 30, and due to the minimum length of each ledge allowing at least 180° of extension around the upper end portion, a complete fluid distribution onto inner surfaces 32 is effected.

It should be noted that fluid inlet means 36 and 38 tangentially dispense fluid perpendicularly and offset with respect to the longitudinal axis of funnel-shaped member 30 thereby allowing gravity to create a downwardly spiraling stream of fluid flushing the inner surfaces 32 of funnel-shaped member 30. An even sheet of fluid flushing all areas of inner surfaces 32 is thereby provided with outlet 34 being substantially filled with fluid from inner surfaces 32. As shown in FIG. 3, the cylindrical body 18a of the inlet section 18 extends below the level of the inlets 36 and 38 to assure that the incoming gas does not contact the dry surface above the ledges 44 and 46. Thus, a completely wetted area along inner surfaces 32 and in outlet 34 is presented against which gas coming from inlet section 18 impinges.

In operation, the gas having entrained solids therein enters funnel-shaped member 30 through inlet section 18 by the force of a negative pressure generated by suction fan 16. Due to the decreased size of outlet 34, the gas increases in velocity as it goes towards outlet 34 as in a venturi thereby causing a portion of the gas to impinge against inner surfaces 32. As previously described, and clearly seen in FIG. 5, inner surfaces 32 of funnel-shaped member 30 are completely wetted due to the novel fluid-distributing means 40 and 42, causing completely wetted inner surfaces and also extreme turbulence in the area of outlet 34. This flushing of inner surfaces 32 effectively prevents a wet-dry-wet condition in that the complete surface area of inner surfaces 32 is constantly cleaned by the progressively distributed water cascading over ledges 44 and 46, as previously set forth.

The particles entrained in the gas passing through inlet 18 are transferred to the fluid dispensed on inner surfaces 32 causing the gas to be cleaned and the fluid to contain the entrained particles.

Thereafter, diverging section 22 as seen in FIG. 1 directs the mixture of gas and liquid with entrained particles therein into cyclonic separator 12 wherein complete separation takes place by centrifugal or cyclonic action.

It is clear then that the progressively diminishing dimensioned ledges 44 and 46 provide an effective fluid-distributing means and causes an even film of fluid to be passed over inner surfaces 32 both guaranteeing that inner surface 32 is completely wetted and also diminishing the possibility that any of the entrained particles will be transferred to the inner surfaces 32 of funnel-shaped member 30. This, of course, is due to the constant washing of the fluid over all areas of inner surfaces 32 during the operation of the subject device effectively preventing the well-known wet-dry-wet condition.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property of privilege is claimed are defined as follows:

1. A venturi gas scrubber comprising: a funnel-shaped member having a large inlet end and a small outlet end with a sidewall tapering from said inlet end to said outlet end; a wetting fluid inlet near said large end for tangentially introducing wetting fluid into said funnel-shaped member; and a fluid-distributing ledge having an upper end positioned adjacent said fluid inlet to receive fluid therefrom, said ledge extending spirally downwardly along the inner surface of said sidewall for at least 180° from said fluid inlet and terminating at a location spaced vertically beneath said fluid inlet but substantially above the outlet end of said funnel member, the width of said ledge decreasing progressively from said fluid inlet to the end thereof remote from said fluid inlet.

2. A gas scrubber comprising: a funnel-shaped member having a cylindrical end portion and a conical sidewall extending from one end of said cylindrical end portion and terminating in an outlet portion of reduced diameter with respect to said cylindrical end portion; a pair of wetting fluid inlets in said cylindrical portion spaced from said one end thereof and located diametrically opposite each other for tangentially introducing wetting fluid into said funnel-shaped member; a pair of fluid-distributing ledges projecting from the inner surface of said cylindrical portion each having one end positioned adjacent a respective one of the wetting fluid inlets and extending spirally downwardly therefrom in the direction of fluid flow from the respective inlet for at least 180° with its other end located adjacent said one end of said cylindrical end portion.

3. A gas scrubber as claimed in claim 2 wherein said other end of each ledge extends beyond said one end of the other ledge.

4. A gas scrubber as claimed in claim 3 wherein the width of each of said ledges decreases progressively from said one end to said other end.

5. A gas scrubber as claimed in claim 2 wherein the width of each of said ledges decreases progressively from said one end to said other end.

6. A gas scrubber as claimed in claim 5 including a gas inlet section having a cylindrical body portion of less diameter than said cylindrical end portion for conducting gas into said funnel-shaped member to be discharged through said outlet portion, said cylindrical body portion extending into said cylindrical end portion past said fluid inlets.

7. A gas scrubber comprising: a funnel-shaped member having a large inlet portion with a sidewall extending therefrom and terminating in a small outlet portion; a pair of wetting fluid inlets near said inlet portion for tangentially introducing wetting fluid into said funnel-shaped member, said wetting fluid inlets being located diametrically opposite each other; and a pair of wetting fluid-distributing ledges projecting from the inner surface of said funnel-shaped member each having one end positioned to receive wetting fluid from a respective one of said wetting fluid inlets and extending downwardly therefrom in the direction of fluid flow from its respective fluid inlet with its other end extending beyond said one end of the other ledge.

8. A gas scrubber as claimed in claim 7 wherein the width of each ledge decreases progressively from said one end to said other end.

9. A gas scrubber as claimed in claim 8 wherein said large inlet portion is cylindrical and said sidewall is conical and extends from the lower end of said cylindrical portion, said ledges projecting from the surface of said cylindrical end portion only.

* * * * *